UNITED STATES PATENT OFFICE.

CONRAD SCHRAUBE AND ERNST LAUDIEN, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

POLYCHLORANILIN DERIVATIVE.

No. 926,023.      Specification of Letters Patent.      Patented June 22, 1909.

Application filed April 24, 1906. Serial No. 313,512.

*To all whom it may concern:*

Be it known that we, CONRAD SCHRAUBE and ERNST LAUDIEN, doctors of philosophy, subjects of the King of Prussia, German Emperor, residing at Ludwigshafen-on-the-Rhine, in the Kingdom of Bavaria, German Empire, have invented new and useful Improvements in Polychloranilin Derivatives and Making Same, of which the following is a specification.

Our invention relates to the manufacture and production of a new class of alkyl-acyl derivatives of polychloranilins which contain three, or more, atoms of chlorin, of which two atoms are in the ortho positions to the amido group $$(NH_2:Cl:Cl = 1:2:6).$$

We have discovered that the aforesaid alkyl-acyl derivatives can be obtained by treating an alkali salt of the corresponding acyl derivatives with a halogen alkyl compound such for instance as methyl chlorid and benzyl chlorid. The said alkali salts can be prepared by treating the acetyl derivatives with for instance caustic alkali or alkali alcoholate, whereupon the hydrogen atom attached to the nitrogen atom is replaced by alkali metal. The aforesaid alkyl-acyl derivatives can also be obtained by treating the corresponding alkyl derivatives with an acid chlorid, or with an acid anhydrid, such for instance as acetyl chlorid and acetic anhydrid.

The polychloranilins, of which the derivatives can be used in carrying out our invention, include 2.4.6—trichloranilin, 2.3.4.6—tetrachloranilin, 2.3.5.6—tetrachloranilin, and 2.3.4.5.6—pentachloranilin.

The new alkyl-acyl derivatives which can be prepared according to our invention constitute a valuable class of compounds, since many of them can be used as substitutes for camphor in the production of substances resembling celluloid, since on mixing them with nitrocellulose, if necessary with the addition of a little alcohol, the nitrocellulose swells and the mixture resembles celluloid. We wish to be understood as claiming our new polychloranilin derivatives either alone, or when in admixture with other compounds. We make no claim to such mixtures of our derivatives with other compounds such as nitrocellulose, but we desire to claim only the new alkyl acyl polychloranilin derivatives contained therein.

The new derivatives which we claim generically are, when pure, colorless compounds and are soluble in alcohol, in benzene, and in glacial acetic acid and possess a constitution corresponding to the formula

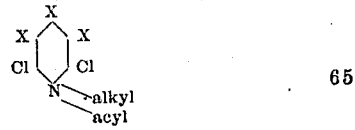

where one X represents chlorin and the other two represent either chlorin or hydrogen.

The new derivatives which we wish to be understood as claiming specifically are asymmetrical and symmetrical ethyl-acetyl-tetrachlor-anilid, which melt at temperatures of about seventy-four and eighty-four degrees centigrade respectively and have the constitution represented by the formula

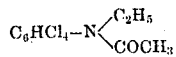

The following examples will serve to further illustrate the nature of our invention and how it can be carried into practical effect, but the invention is not confined to these examples. The parts are by weight.

Example 1: Heat together, in an autoclave, on the water-bath, one hundred (100) parts of acet-tetrachloranilid $$(NH.Ac:Cl:Cl:Cl:Cl = 1:2:3:4:6),$$

two hundred and fifty (250) parts of alcohol (in which seven and a half (7.5) parts of sodium have previously been dissolved) and twenty-five (25) parts of ethly chlorid, and continue the heating for about twenty-four (24) hours, or until the pressure (which at the commencement of the reaction was about three (3) atmospheres) no longer decreases. Distil off the alcohol, melt the residue, and wash it with hot water in order to remove the sodium chlorid formed. The reaction product can be purified either by distillation in vacuo, or by crystallization from alcohol, and as-ethylacetyl-tetrachloranilid (melting at a temperature of from seventy-three (73), to seventy-four (74), degrees centigrade) be obtained. The reaction which takes place can be represented by the formula

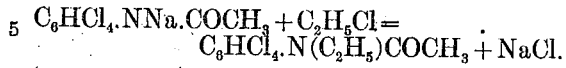

Example 2: Heat together, in an autoclave, on the water-bath, for about twenty-four (24) hours, one hundred (100) parts of as-acet-tetrachloranilid, two hundred and fifty (250) parts of wood spirit (in which fifteen (15) parts of caustic soda have been previously dissolved and twenty (20) parts of methyl chlorid. The pressure rises to about six (6) atmospheres. Work up the product as described in the foregoing example, whereupon as - methyl - acetyl - tetrachloranilid (melting point ninety-six (96), to ninety-seven (97), degrees centigrade) is obtained. The reaction which takes place can be represented by the formula

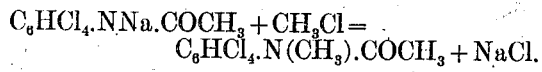

Example 3: Boil together, in a reflux apparatus, for about six (6) hours, one hundred (100) parts of s-acet-tetrachloranilid, five hundred (500) parts of alcohol, in which fifteen (15) parts of caustic soda have previously been dissolved, and fifty (50) parts of benzyl chlorid, and work up the product as described in the foregoing example 1; s - benzyl - acetyl - tetrachloranilid (melting point ninety-seven (97) degrees centigrade) can thus be obtained. The reaction which takes place can be represented by the formula

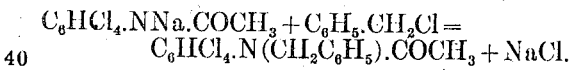

Example 4: Boil together for about six (6) hours, in a reflux apparatus, one hundred (100) parts of as-benzoyltetrachloranilid (melting point about two hundred and four (204) degrees centigrade), three hundred (300) parts of alcohol, in which six and nine-tenths (6.9) parts of sodium have previously been dissolved, and thirty-eight (38) parts of benzyl chlorid, and work up the product as described in the foregoing example 1, whereupon benzyl-benzoyl-tetrachloranilid (melting at a temperature of one hundred and thirty-four (134) degrees centigrade) is obtained. The reaction which takes place can be represented by the formula

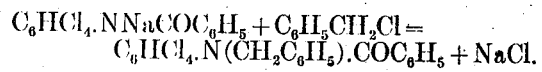

Now what we claim is:

1. The process for the production of alkyl acyl derivatives of a hereinbefore defined polychloranilin by heating in a suitable solvent an alkali salt of an acyl derivative of such polychloranilin with a halogen alkyl compound.

2. The process for the production of ethyl-acetyl-tetrachloranilid by heating in a suitable solvent an alkali salt of acetyl-tetra-chloranilid with ethyl chlorid.

3. As new articles of manufacture the alkyl acyl derivatives of a hereinbefore defined polychloranilin which compounds when pure are colorless and crystalline and are soluble in alcohol and in benzene and in glacial acetic acid and possess a constitution corresponding to the formula

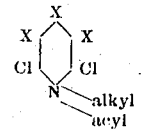

where one X represents chlorin and the other two represent either chlorin or hydrogen.

4. As a new article of manufacture ethyl-acetyl-tetrachloranilid which when pure is colorless and crystalline and is soluble in alcohol and in benzene and in glacial acetic acid and which melts at a temperature of about seventy-four (74) degrees centigrade and which possesses a constitution corresponding to the formula

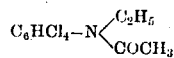

In testimony whereof we have hereunto set our hands in the presence of two subscribing witnesses.

CONRAD SCHRAUBE.
ERNST LAUDIEN.

Witnesses:
J. ALEC. LLOYD,
ERNEST G. EHRHARDT.